(12) United States Patent
Eberle et al.

(10) Patent No.: US 9,751,031 B2
(45) Date of Patent: *Sep. 5, 2017

(54) FILTER DEVICE

(75) Inventors: Richard Eberle, Ormesheim (DE); Micha Kreibig, Rehlingen-Siersburg (DE); Thomas Scholl, Saarlouis (DE); Markus Dewes, Oberthal (DE); Sven Brall, Saarbrücken (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 370 days.

This patent is subject to a terminal disclaimer.

(21) Appl. No.: 13/261,693

(22) PCT Filed: Nov. 19, 2011

(86) PCT No.: PCT/EP2011/005850
§ 371 (c)(1),
(2), (4) Date: Jul. 15, 2013

(87) PCT Pub. No.: WO2012/095124
PCT Pub. Date: Jul. 19, 2012

(65) Prior Publication Data
US 2013/0292310 A1    Nov. 7, 2013

(30) Foreign Application Priority Data
Jan. 15, 2011 (DE) .................. 10 2011 008 671

(51) Int. Cl.
*B01D 29/00* (2006.01)
*B01D 35/00* (2006.01)
(Continued)

(52) U.S. Cl.
CPC .......... *B01D 35/005* (2013.01); *B01D 29/58* (2013.01); *B01D 35/30* (2013.01); *B01D 35/306* (2013.01);
(Continued)

(58) Field of Classification Search
CPC .... B01D 36/003; B01D 36/006; B01D 17/00; B01D 17/02; B01D 17/0214;
(Continued)

(56) References Cited

U.S. PATENT DOCUMENTS

| | | | |
|---|---|---|---|
| 4,740,299 A * | 4/1988 | Popoff et al. | 210/232 |
| 2008/0135469 A1* | 6/2008 | Fremont et al. | 210/234 |
| 2009/0184041 A1* | 7/2009 | Hoverson et al. | 210/232 |

FOREIGN PATENT DOCUMENTS

| | | |
|---|---|---|
| DE | 7026232 | 3/1971 |
| DE | 31 24 602 A1 | 7/1982 |

(Continued)

*Primary Examiner* — Patrick Orme
(74) *Attorney, Agent, or Firm* — Wenderoth, Lind & Ponack, L.L.P.

(57) ABSTRACT

A filter device, in particular for fluids contaminated with water admixtures, such as diesel oil, has a filter housing (1) holding at least one filter element (9). The filter medium of the filter element separates an untreated side (13) from a treated side (19) during the filtration process in the filter housing (1). A water collecting unit (5) is provided and holds separated water on the untreated side. Water separated on the untreated side (13) also reaches the collecting unit (5). Mutually separated collecting chambers (61, 67) are present in the collecting unit (5) for the water discharged at the treated side (19) and at the untreated side (13).

11 Claims, 3 Drawing Sheets

(51) Int. Cl.
  *F02M 37/22* (2006.01)
  *B01D 35/30* (2006.01)
  *B01D 29/58* (2006.01)
  *B01D 36/00* (2006.01)

(52) U.S. Cl.
  CPC ........... *B01D 36/006* (2013.01); *F02M 37/22* (2013.01); *B01D 2201/295* (2013.01); *B01D 2201/309* (2013.01); *B01D 2201/34* (2013.01)

(58) Field of Classification Search
  CPC .... B01D 17/045; B01D 27/08; B01D 27/148; B01D 2201/291; B01D 2201/295; B01D 2201/298; B01D 2201/302; B01D 2201/34; B01D 29/15; B01D 29/58; B01D 5/005; F02M 37/221
  USPC ... 210/85, 94, 248, 303, 307, 312, 314, 315, 210/435
  See application file for complete search history.

(56) References Cited

FOREIGN PATENT DOCUMENTS

| | | |
|---|---|---|
| DE | 10 2005 015194 A1 | 10/2006 |
| EP | 0 188 524 B1 | 7/1986 |
| EP | 0 260 069 A2 | 3/1988 |
| EP | 1 932 574 A1 | 6/2008 |
| FR | 2 851 790 A1 | 9/2004 |
| JP | 60 018261 U | 2/1985 |

* cited by examiner

FILTER DEVICE

FIELD OF THE INVENTION

The invention relates to a filter device, in particular for fluids contaminated with water admixtures, such as diesel oil, comprising a filter housing holding at least one filter element. The filter medium of the filter element separates an untreated side from a treated side during the filtration process in the filter housing. A water collecting unit is provided that holds separated water on the treated side.

BACKGROUND OF THE INVENTION

Filter devices of this kind are known in the prior art. They are used, for example, in fuel systems for combustion engines to protect sensitive components, particularly injection systems, against impairment due to water fractions that are carried along in the fuel. The separation of the water fractions carried along in the fuel can be achieved by a coagulation process that causes the formation of water droplets on the filter medium. The water droplets can then flow off from a separating chamber formed on the filter element to the water collecting unit.

SUMMARY OF THE INVENTION

An object of the present invention to provide an improved filter device having a comparatively higher level of efficiency in terms of water separation.

According to the invention, this object is basically achieved by a filter device with the water collecting unit having separate collecting chambers formed therein for water that is discharged from the treated side as well as for water that is discharged from the untreated side.

In contrast to the prior art, in addition to utilizing the coalescence effect by which droplet formation occurs when the filtered fluid penetrates on the treated side of the system, water that is separated on the untreated side is also routed into the allocated collecting chamber of the collecting unit. The water separation on the untreated side is primarily achieved by separating relatively large water drops based on a gravitational effect. Utilizing a coalescence effect, additional droplet formation can also be achieved on the untreated side of the filter medium, in particular, when the filter medium is coated with a coalescing medium on the untreated side thereof. Due to the separation on the untreated side, the entire water load in the fuel need not completely penetrate the filter medium. Instead, only small and the tiniest water drops pass through the filter medium, coalesce and are separated into the collecting chamber on the clean side that is separate from the collecting chamber on the untreated side. Advantageously, the filter device can operate according to the invention with fuel having a higher water load and without detriment to the effect, for example, due to an excess saturation of the filter medium.

The two collecting chambers are preferably separated from each other in a fluid-proof manner. In especially advantageous embodiments, fluid can flow through the filter element from the outer, untreated side, that is adjacent to the side wall of the filter housing, toward the inner filter cavity that constitutes the treated side. From the treated side, the separated water is discharged into the first collecting chamber of the collecting unit.

Especially preferred, a separator forms a separating element between the bottom end of the main part of the housing that receives the filter element, as well as between the first and second collecting chambers of the water collecting unit.

The configuration can be particularly advantageously selected such that the separator includes a central opening that is aligned with the axis of the filter cavity of the filter element for discharging the water separated on the treated side into the collecting chamber centrally located in the collecting unit. Also, at least one passageway is radially offset relative to the opening for discharging water separated on the untreated side toward the second collecting chamber surrounding the first collecting chamber.

For the connection between the untreated side and the allocated collecting chamber, a gap can be provided between the interior wall of the housing and the base-side end region of the filter element, preferably in form of a circumferential annular gap. Through the annular gap, the water is discharged from the untreated side to the collecting chamber that can be allocated thereto.

The arrangement is particularly advantageously selected such that the bottom end of the filter medium or of the base-side end region of the filter element directed toward the collecting unit is framed by an end cap fastened to an element receptacle of the filter housing. The element receptacle includes the central opening for the water that is discharged from the treated side and forms the separator, together with a wall part that extends between the central opening and the side wall of the housing. Inside that side wall, the openings for the water discharge from the untreated side are formed.

It is especially advantageous to select the configuration such that the element receptacle for receiving a central pipe connection of the end cap that continues the filter cavity includes a central receptacle connection. The bottom edge of the central receptacle connection is directed toward the collecting unit, constituted by a bowl-shaped base part of the housing, and is in a sealed connection with the top end edge of the first collecting chamber. The first collecting chamber is constituted by a hollow cylinder centrally disposed in the base part and closed on the base side.

Preferably, the wall part of the element receptacle includes the openings for the water discharged from the untreated side and is adjacent to a downward protruding annular body of the housing forming the connection between the main part of the housing and the base part. The side wall of the base part is connected to the annular body by a sealing element, thus closing, together with the side wall, the second collecting chamber on the untreated side surrounding the internally located first collecting chamber.

A discharge screw is preferably disposed on the base side of each collecting chamber. Especially advantageously, the base part includes a wall part that allows at least for the visual detection of at least the filling state of the outer, second collecting chamber. The base part is advantageously formed in one piece, for example, of a plastic material that offers sufficient transparency.

To provide for visibility in cases when the water volume of the inner collecting chamber on the treated side is surrounded in large part by a water quantity that is discharged on the untreated side, giving the operator the possibility to discharge water quantities that are separated on the treated and untreated sides, and in as far as possible free of any diesel oil located thereabove, the apparatus is advantageously configured such that the discharge screw of the inner, first collecting chamber is disposed on a viewer tube that extends downward from the base of the first collecting chamber to create a visually usable monitoring path.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
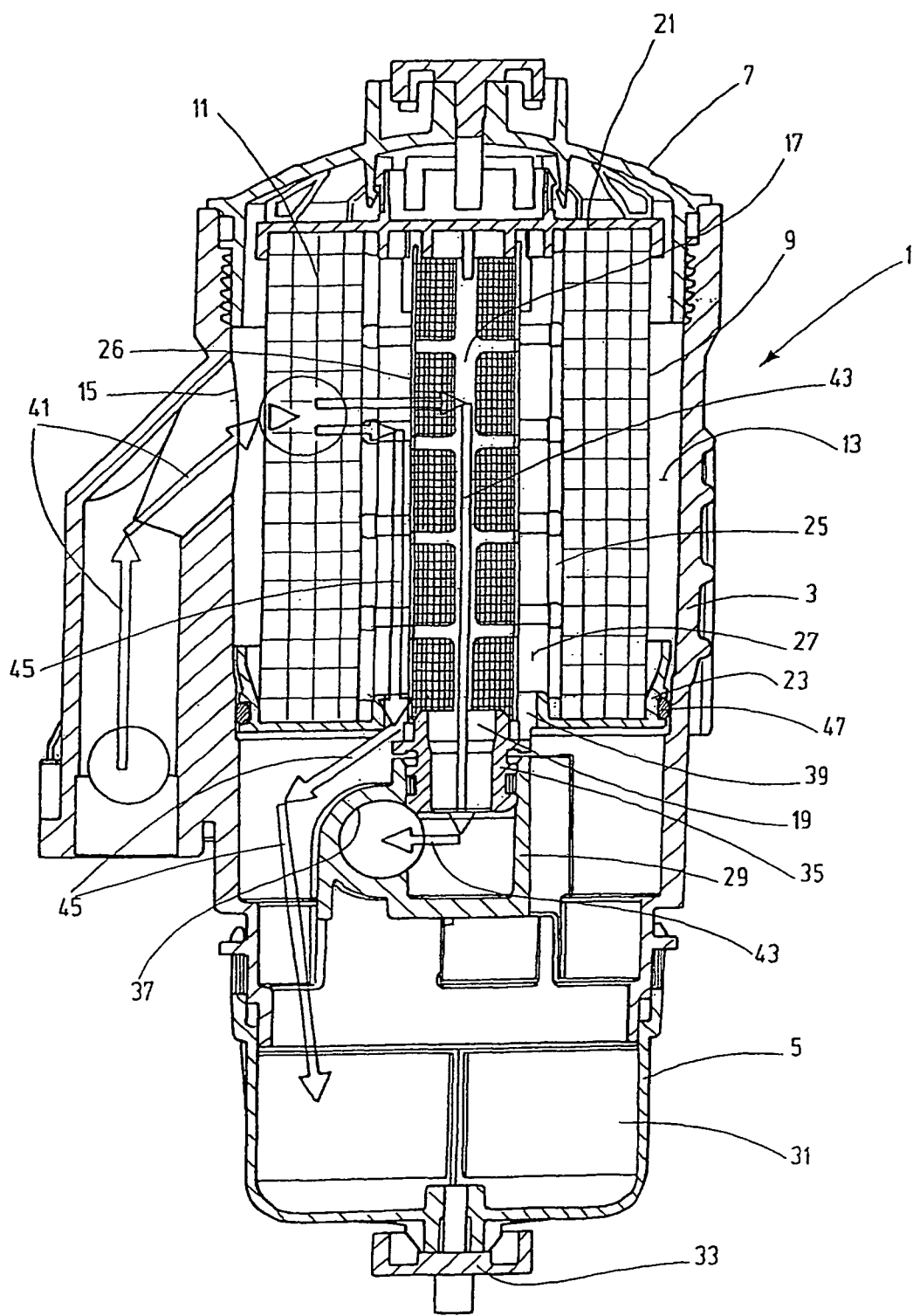
FIG. 1 is a side elevational view in section of a fuel filter device according to the prior art that is equipped with a water separation device.

The invention will be explained in further detail below using the example of a fuel filter that is provided in a fuel supply system (not shown) of a combustion engine for cleaning diesel oil that is contaminated with certain water admixtures. The invention is equally suited for other types of fluids.

The device includes a filter housing 1 with a main part 3 in the shape of a hollow cylinder, as well as a base part 5 that follows at its bottom side. The top end has a screwed connection of a housing lid 7 with the main part 3. The housing lid is removable for the installation and removal of a filter element 9. An intermediate space is between the outer side of the filter medium 11, constituted of a filter mat, of the filter element 9 received by the housing 1 and the interior wall of housing 1 that constitutes the untreated side 13 during the filtration process. The fuel that must be cleaned can be supplied to the untreated side 13 through an inlet opening 15 and flows through the filter element 9 from the outside to the inside toward an interior filter cavity 17 forming the treated side 19 during the filtration process.

End caps 21 and 23 are provided on the ends of filter element in a customary manner and form framings for the filter medium 11. A fluid-permeable support tube 25 is located adjacent to the filter medium inner side. A hydrophobic screen 26 is disposed at a radial distance relative to the support tube 25 that surrounds the inner filter cavity 17 in the manner of a pipe. Such fuel filters use a filter medium 11 to achieve a separation of water that has a coagulating effect on the water being carried along by the fuel, causing the water to precipitate as droplets that are left behind in the intermediate space between the support tube 25 and the hydrophobic screen 26. The droplets then sink downward, because the screen 26 is impermeable to coagulated water drops. The intermediate space thus constitutes a water separating chamber 27 into which the separated water sinks, all the way down to the end cap 23.

The filter element 9 is mounted to an element receptacle 29 fixed on the housing by this bottom end cap 23. The element receptacle 29 is located above the base part that forms a water collecting chamber 31, from which collecting chamber separated water can be discharged via a water outlet 33. For the interaction with the element receptacle 29, the end cap 23 includes, corresponding to the prior art, a central pipe connection 35 as an opening for the cleaned fuel that exits on the treated side 19, meaning the inner filter cavity 17. The cleaned fuel reaches a fuel outlet 37 disposed in the element receptacle 29, and from there is conveyed to the outer side of the housing 1. For the discharge of the separated water located in the separating chamber 27, the end cap 23 contains a water opening 39 that surrounds the pipe connection 35. Opening 39 is open toward the separating chamber 27 and through which the separated water reaches the water collecting chamber 31 immediately along the outer side of the element receptacle 29. The corresponding flow behavior is illustrated in FIG. 1 by the flow arrows indicating the flow directions. Arrow 41 indicates the fuel inflow to the untreated side 13. Arrow 43 indicates the flow of the cleaned diesel oil. Arrow 45 indicates the water flow. For the purpose of sealing the untreated side 13 located on the outer side of the filter element 9 in relation to the base-side water collecting chamber 31, a sealing apparatus is disposed on the outer circumference of the end cap 23 in the form of a sealing ring 47 that provides sealing action against the inner side of the filter housing. The end cap 23 thus constitutes a separator that separates the main part 3 of the housing 1 from the base part disposed therebelow, which base part constitutes the water collecting chamber 31.

Figure 2:
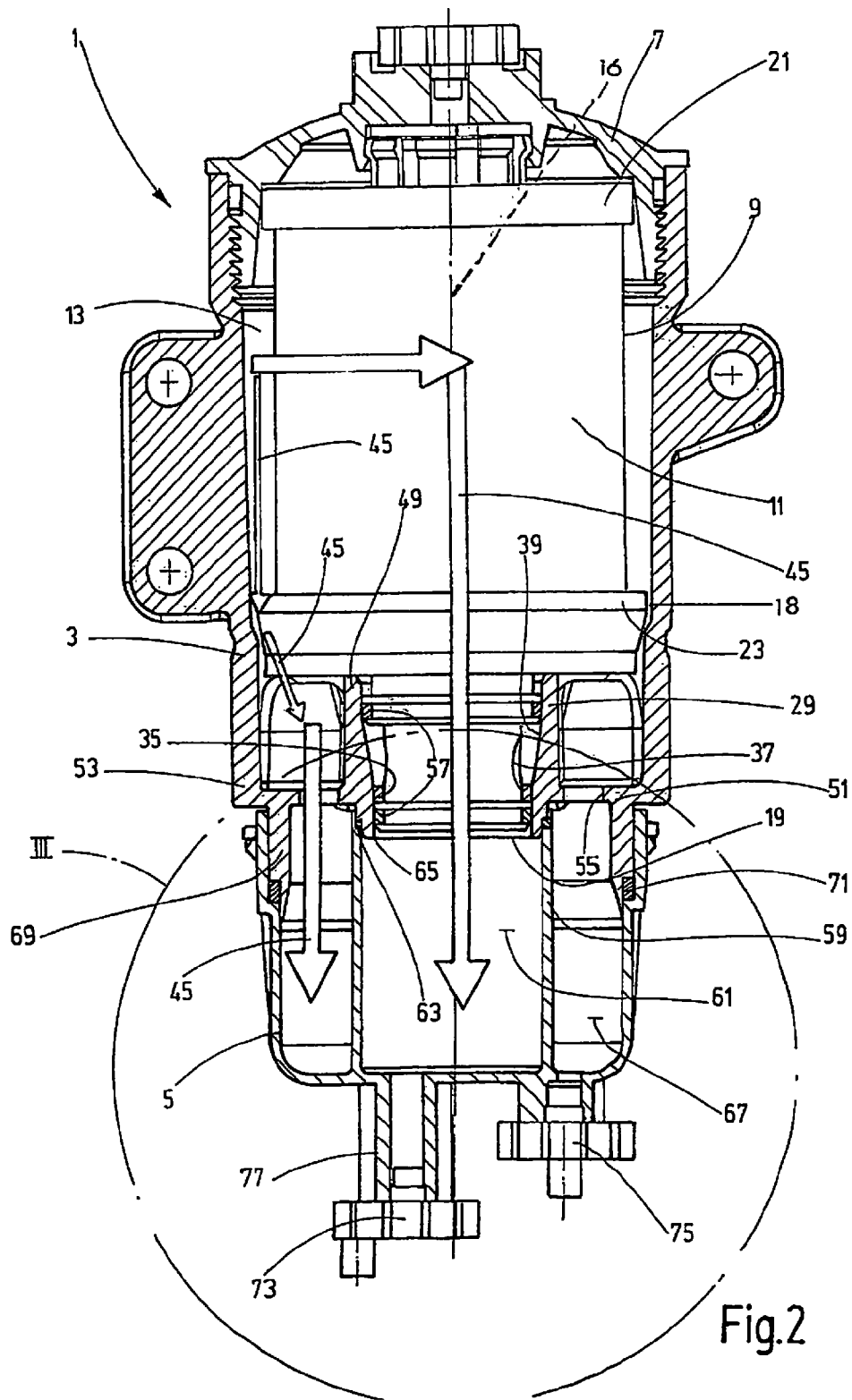
FIG. 2 is a side elevational view section of a filter device according to an exemplary embodiment of the invention, drawn as a slightly schematically simplified representation.

FIG. 2 shows an exemplary embodiment of the filter device having a longitudinal axis 16 according to the invention. The inlet opening (15 in FIG. 1) for the fuel inlet to the untreated side 13 of the housing 1 is presently not shown. The internal structure of the filter element 9 is also not shown and can correspond to the prior art, as depicted in FIG. 1. As in FIG. 1, for a decontaminated fuel discharge from the treated side 19, i.e., the internal filter cavity 17, a fuel outlet 37 is provided, disposed in the element receptacle 29, leading to the outer side of the housing 1.

While the end cap 23 of the filter element 9 in the prior art constitutes the separator between the housing main part 3 and the collecting unit (base part) disposed therebelow on the radially externally located edge with a sealing element 47 that rests against the housing wall, in the embodiment as shown in FIG. 2, a gap 18 is disposed between the outside edge of the end cap 23 and the housing wall 53. By gap 18, the untreated side 13 continues downward in the direction of the element receptacle 29. Water that is separated at the untreated side 13 is thus discharged, in the direction of the base part, as illustrated by the arrow 45. The element receptacle 29 includes the receptacle or receiving pipe connection 49 thereof that protrudes upward. The seat for the central pipe connection 35 protrudes from the end cap 23 of the filter element 9 and is received in a sealing manner by sealing rings 57 in the receptacle or receiving pipe connection 49. Also, element receptacle 29 forms the separator between the untreated side 13 and the treated side 19 and is disposed in the base part between a first collecting chamber 61 on the treated sick and a second collecting chamber 67 on the untreated side. Inside the base part, the first collecting chamber 61 is formed by a hollow cylinder 59 closed at the base side and open to the top. The end edge of this top opening of the first collecting chamber 61 is connected to the bottom end edge 65 of the receptacle or receiving pipe connection 49 of the element receptacle 29 via a sealing ring 63. The first water collecting chamber 61, that is a component of the treated side 19 of the system, is then sealed in a fluid-proof manner in relation to the space surrounding it within the base part. This surrounding part constitutes the second water collecting chamber 67.

As a component of the separator, the element receptacle 29 includes a wall part 51 that extends between the receptacle or receiving pipe connection 49 and the housing wall 53. This wall part 51 includes passageways 55 that open, next to the hollow cylinder 59 of the first collecting chamber 61 in the second collecting chamber 67 surrounding the first collecting chamber 61. Through passageway 55 the water separated on the untreated side is discharged, such that the second collecting chamber 67 constitutes a component of the untreated side 13. To achieve a sealing action of the second collecting chamber 67 relative to the side wall 53 of the housing 1, the base part is formed in a bowl-shape and slips past the top edge region thereof, over an annular body 69 that extends downward from the wall part 51 including the passageways 55. A sealing element 71 is inserted between steps on the annular body 69 and the wall of the base part to seal off the second collecting chamber 67 to the outside.

Figure 3:
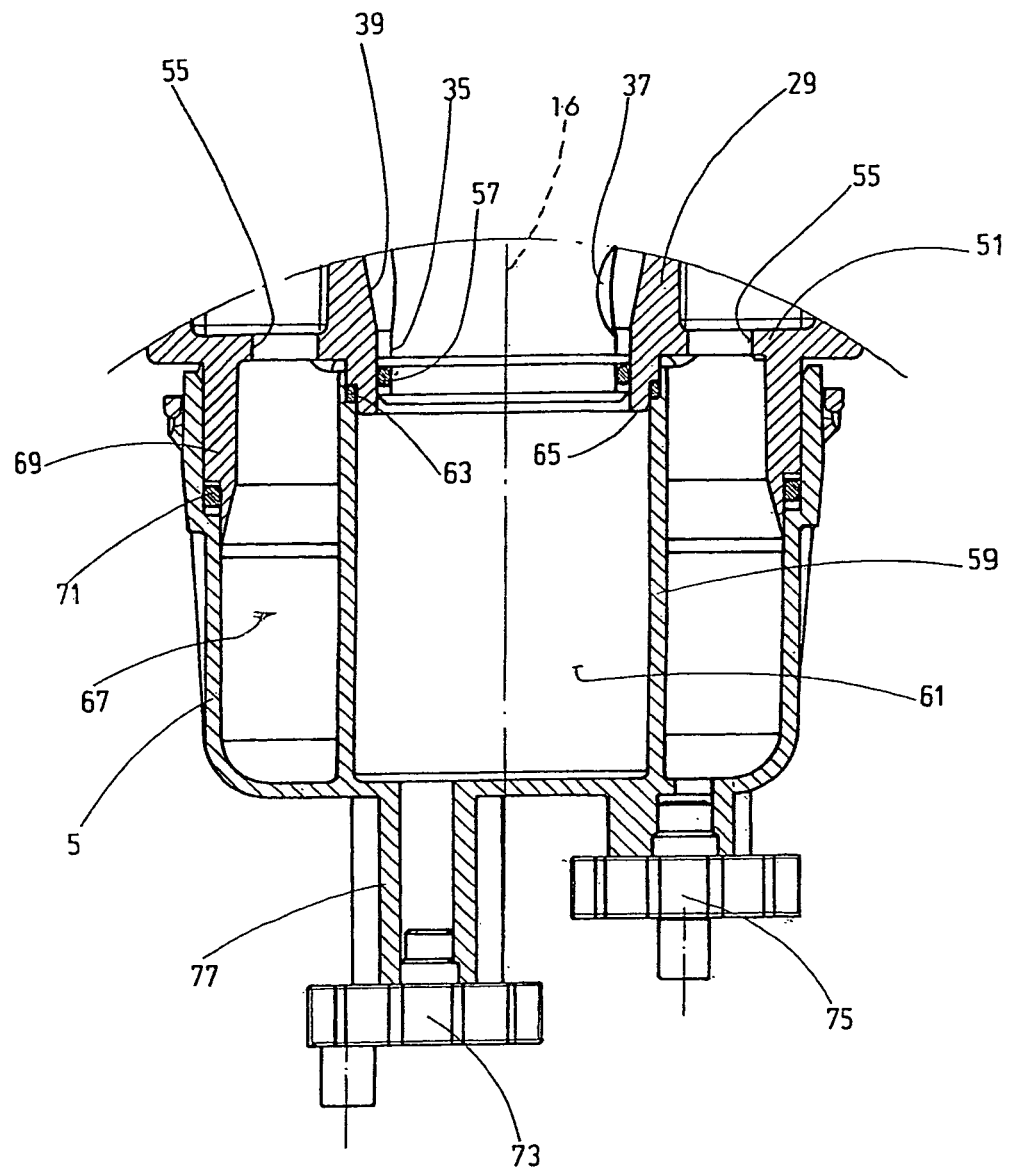
FIG. 3 is a partial, enlarged side elevational view in section of the area designated as III in FIG. 2.

The base part can be shaped in one piece from a material that is transparent to light, at least to such an extent that a visual detection of the filling level is possible. While the outside-lying second collecting chamber 67 is visually accessible, monitoring the filling level of the inside-lying first collecting chamber 61 can be rendered more difficult, or even completely impossible, when the outer collecting chamber 67 is filled to a corresponding level. To remedy this situation, the base-side discharges 73 and 75, provided for both collecting chambers 61 and 67, respectively, are disposed at different heights. As shown in the drawings of FIGS. 2 and 3, the discharge 73 is disposed away from the base of the first collecting chamber 61, offset downward by pipe connection 77. Correspondingly, the pipe connection 77 acts as a viewer tube for discharge processes allowing for the discharge of water from the first water collecting chamber 61 to such a level that virtually no diesel oil that is located thereabove is discharged, because one can visually monitor the discharge process. The same applies, correspondingly, for discharge processes from the second collecting chamber 67. The filling level of the second collecting chamber 67 is easily monitored visually.

While one embodiment has been chosen to illustrate the invention, it will be understood by those skilled in the art that various changes and modifications can be made therein without departing from the scope of the invention as defined in the appended claims.

What is claimed is:

1. A filter device for fluids contaminated with water admixture, comprising:
    a filter housing having an element receptacle therein, said element receptacle having an upwardly projecting receiving pipe connection;
    a filter element being in said filter housing on said element receptacle, having a filter medium separating an untreated side thereof from a treated side thereof during filtration and having an end cap with a central pipe support projecting therefrom, said central pipe support being received in said receiving pipe connection;
    a water collecting unit in said filter housing having separated first and second collecting chambers receiving water discharged on said treated side and said untreated side, respectively, said first collecting chamber being inside said second collecting chamber, said first collecting chamber including a hollow cylinder closed on a base side thereof and open on an upper end thereof, an end edge of said upper end being connected to said element receptacle by a first sealing ring connected to a lower end edge of receiving pipe connection; and
    sealing rings between said central pipe support and said receiving pipe connection providing a sealed connection therebetween.

2. A filter device according to claim 1 wherein
    said first and second collecting chambers are separate from one another in a fluid-proof manner.

3. A filter device according to claim 1 wherein
    a coalescor is adjacent said treated side to separate water on said treated side; and
    a gravitational effect separates water on said treated side.

4. A filter device according to claim 1 wherein
    said untreated side is on an outer side of said filter medium adjacent a side wall of said filter housing; and
    said treated side is on an inside of said filter medium defining an inner filter cavity;
    whereby, during filtration, fluid flows from the untreated side to the treated side and into the inner filter cavity, and water separated on the treated side flows into said first collecting chamber.

5. A filter device according to claim 1 wherein
    a separating element separates a main part of said filter housing receiving a bottom end of said filter element from said first and second collecting chambers.

6. A filter device according to claim 1 wherein
    said separating element comprises a central opening aligned with a longitudinal axis of an inner filter cavity surrounded by said treated side to discharge water separated on said treated side into said first collecting chamber and comprises at least one passageway radially offset relative to said central opening to discharge water separated on said untreated side into said second collecting chamber.

7. A filter device according to claim 1 wherein
    a circumferential annular gap extends between an inner wall of said filter housing and a base-side end region of said filter element to convey water from said untreated side into said second collecting chamber.

8. A filter device according to claim 1 wherein
    a bottom end of said filter medium adjacent said water collecting unit is framed by said end cap, said element receptacle including a central opening conveying water from said treated side and providing a separator with a wall part extending between said central opening and a side wall of said filter housing, passageways in said wall part conveying water from said untreated side.

9. A filter device according to claim 8, wherein
    said wall part is adjacent to an annular body of said filter housing protruding downwardly and forming a connection between a main part and a base part of said filter housing with a sealing element located between said annular body and said base part, said wall closing said second collecting chamber.

10. A filter device according to claim 1, wherein
    said first and second collecting chambers are housed in a base part of said filter housing, said base part having at least one wall part allowing visual detection of at least a filling level of said second collecting chamber.

11. A filter device according to claim 10 wherein
    a viewer tube extends downward from a base side of said first collecting chamber; and
    said wall part of said base part and said viewer tube are made of a material transparent to light.

* * * * *